US008363609B2

(12) United States Patent
Zhang

(10) Patent No.: US 8,363,609 B2
(45) Date of Patent: Jan. 29, 2013

(54) APPARATUS AND METHOD FOR ESTABLISHING AD-HOC MODE CONNECTION USING CELLULAR NETWORK IN WIRELESS COMMUNICATION SYSTEM

(75) Inventor: Jinghua Zhang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 12/479,443

(22) Filed: Jun. 5, 2009

(65) Prior Publication Data
US 2009/0323659 A1 Dec. 31, 2009

(30) Foreign Application Priority Data

Jun. 26, 2008 (KR) .................. 10-2008-0060682

(51) Int. Cl.
*H04Q 7/00* (2006.01)
(52) U.S. Cl. .................. 370/329; 370/338; 455/450
(58) Field of Classification Search .................. 370/328, 370/329, 338; 455/450–452.2
See application file for complete search history.

(56) References Cited

U.S. PATENT DOCUMENTS

| 2004/0190468 | A1* | 9/2004 | Saijonmaa ................... 370/312 |
| 2005/0096027 | A1* | 5/2005 | Takahashi et al. ............ 455/418 |
| 2006/0062190 | A1* | 3/2006 | Suga ............................. 370/338 |
| 2006/0165035 | A1 | 7/2006 | Chandra et al. |
| 2007/0036284 | A1* | 2/2007 | Raghav et al. ............... 379/67.1 |
| 2007/0076681 | A1* | 4/2007 | Hong et al. ................... 370/349 |
| 2007/0286215 | A1* | 12/2007 | Morris .......................... 370/401 |
| 2007/0291722 | A1* | 12/2007 | Lee .............................. 370/338 |
| 2007/0294263 | A1* | 12/2007 | Punj et al. ..................... 707/10 |
| 2008/0107080 | A1* | 5/2008 | Tsai ............................. 370/331 |

FOREIGN PATENT DOCUMENTS

| KR | 10-2006-0093027 A | 8/2006 |
| KR | 10-2008-0022661 A | 3/2008 |
| WO | 2004/079995 A1 | 9/2004 |

* cited by examiner

*Primary Examiner* — Pao Sinkantarakorn
(74) *Attorney, Agent, or Firm* — Jefferson IP Law, LLP

(57) ABSTRACT

An apparatus and a method for establishing an ad-hoc mode connection in a cellular wireless communication system are provided. In the method, a request message requesting an ad-hoc mode connection with a counterpart mobile terminal is transmitted to a base station in a cellular network. A Service Set Identifier (SSID) and Internet Protocol (IP) address information are received from the base station. The ad-hoc mode connection with the counterpart mobile terminal is established using the SSID and IP address information.

22 Claims, 7 Drawing Sheets

APPARATUS AND METHOD FOR ESTABLISHING AD-HOC MODE CONNECTION USING CELLULAR NETWORK IN WIRELESS COMMUNICATION SYSTEM

PRIORITY

The present application claims the benefit under 35 U.S.C. §119(a) of a Korean patent application filed in the Korean Intellectual Property Office on Jun. 26, 2008 and assigned Serial No. 10-2008-0060682, the entire disclosure of which is hereby incorporated by reference.

BACKGROUND OF THE INVENTION

1. Field of the Invention

The present invention relates to a wireless communication system. More particularly, the present invention relates to an apparatus and a method for establishing an ad-hoc mode connection between mobile terminals in a wireless communication system.

2. Description of the Related Art

Wireless Fidelity (WiFi) denotes one of Wireless Local Area Network (WLAN) communication techniques, and is based on the Institute of Electrical and Electronics Engineers (IEEE) 802.11 standard. In a case of performing wireless communication between two mobile terminals using WiFi, two connection modes may be used. One is an infrastructure mode where a mobile terminal accesses an Access Point (AP) or a wireless router, and transmits/receives data to/from a counterpart terminal via the AP or the wireless router. The other is an ad-hoc mode where a mobile terminal directly forms a connection via a wireless channel without a connection passing through an intermediate apparatus.

According to the infrastructure mode, establishment of a connection in a mobile terminal is relatively simple and convenient. That is, a mobile terminal has only to request a connection to an accessible AP, and does not need to have detailed knowledge on establishment of a WiFi connection in the infrastructure mode. That is, all procedures for network setup are processed by an AP, i.e., a base station connected with a backbone network. On the other hand, according to the ad-hoc mode, a mobile terminal should directly process a procedure for network setup without an AP, and should directly configure parameters for network configuration. For example, a mobile terminal should directly set up a Service Set Identifier (SSID) for discriminating a network formed with a counterpart terminal, and an Internet Protocol (IP) address of the mobile terminal itself. In other words, the mobile terminal should select a proper wireless channel, search for an SSID not used in the selected service, and set an IP address.

As described above, when establishing the ad-hoc mode connection, two mobile terminals should process all procedures for establishment of the connection. In other words, a mobile terminal should be able to perform functions for establishing the ad-hoc mode. Accordingly, to support the ad-hoc mode, an operation load amount of a mobile terminal increases, and the construction of the terminal is complicated.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reducing complexity of a mobile terminal that supports an ad-hoc mode connection in a cellular wireless communication system.

Another aspect of the present invention is to provide an apparatus and a method for simplifying a procedure required for establishing an ad-hoc mode connection using a cellular network in a cellular wireless communication system.

Still another aspect of the present invention is to provide an apparatus and a method for determining parameters required for establishing an ad-hoc mode connection using a cellular network in a cellular wireless communication system.

In accordance with an aspect of the present invention, a method for operating a mobile terminal in a cellular wireless communication system is provided. The method includes transmitting a request message requesting an ad-hoc mode connection with a counterpart mobile terminal to a base station in a cellular network, receiving a Service Set IDentifier (SSID) and Internet Protocol (IP) address information from the base station, and establishing the ad-hoc mode connection with the counterpart mobile terminal using the SSID and the IP address information.

In accordance with another aspect of the present invention, a method for operating a mobile terminal in a cellular wireless communication system is provided. The method includes receiving a request message requesting acceptance of an ad-hoc mode connection with a counterpart mobile terminal from a base station in a cellular network, when the ad-hoc mode connection is acceptable, transmitting a confirmation message informing of the acceptance to the base station, receiving an SSID and IP address information from the base station, and establishing the ad-hoc mode connection with the counterpart mobile terminal using the SSID and the IP address information.

In accordance with still another aspect of the present invention, a method for operating a base station in a cellular wireless communication system is provided. The method includes confirming a request and acceptance of a first mobile terminal and a second mobile terminal which intend to establish an ad-hoc mode connection, setting up an SSID and IP addresses for the ad-hoc mode connection of the first mobile terminal and the second mobile terminal, and transmitting the SSID and the IP addresses to the first mobile terminal and the second mobile terminal.

In accordance with yet another aspect of the present invention, an apparatus of a mobile terminal in a cellular wireless communication system is provided. The apparatus includes a cellular communication unit for transmitting a request message requesting an ad-hoc mode connection with a counterpart mobile terminal to a base station in a cellular network, and for receiving an SSID and IP address information from the base station, and a controller for establishing the ad-hoc mode connection with the counterpart mobile terminal using the SSID and the IP address information.

In accordance with further another aspect of the present invention, an apparatus of a mobile terminal in a cellular wireless communication system is provided. The apparatus includes a cellular communication unit for receiving a request message requesting acceptance of an ad-hoc mode connection with a counterpart mobile terminal from a base station in a cellular network, and when the ad-hoc mode connection is acceptable, for transmitting a confirmation message informing the acceptance to the base station, and for receiving an SSID and IP address information from the base station, and a controller for establishing the ad-hoc mode connection with the counterpart mobile terminal using the SSID and the IP address information.

In accordance with further another aspect of the present invention, an apparatus of a base station in a cellular wireless communication system is provided. The apparatus includes a controller for confirming a request and acceptance of a first mobile terminal and a second mobile terminal which intend to establish an ad-hoc mode connection, a manager for setting an SSID and IP addresses for the ad-hoc mode connection of the first mobile terminal and the second mobile terminal, and a communication unit for transmitting the SSID and the IP addresses to the first mobile terminal and the second mobile terminal.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description when taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for determining parameters required for establishing an ad-hoc mode connection using a cellular network in a cellular wireless communication system.

Figure 1:
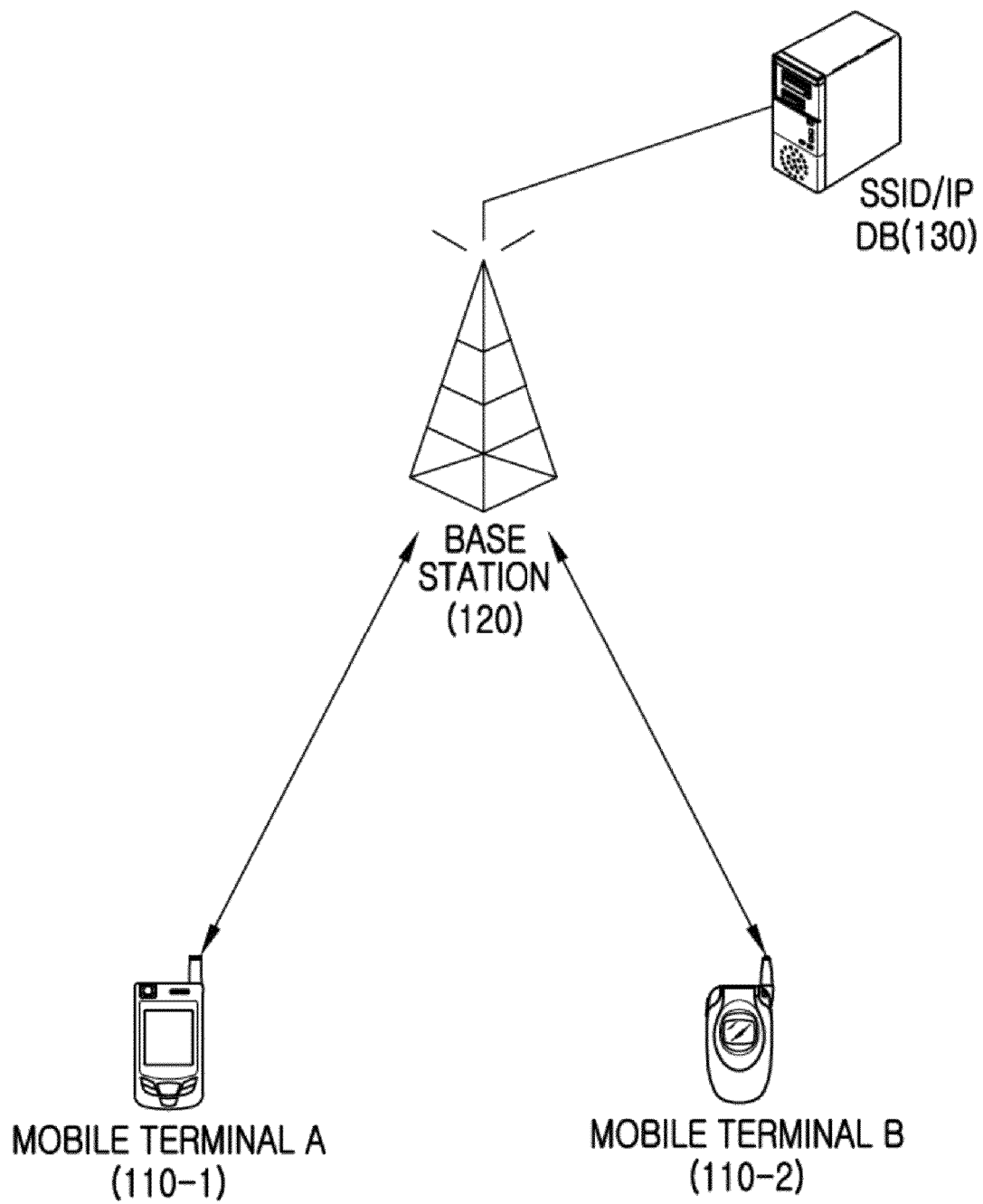
FIG. 1 is a schematic view illustrating a cellular wireless communication system according to an exemplary embodiment of the present invention.

FIG. 1 is a schematic view illustrating a cellular wireless communication system according to an exemplary embodiment of the present invention.

Referring to FIG. 1, a mobile terminal A 110-1 and a mobile terminal B 110-2 exist inside a cell of a base station, and the base station may access a Service Set IDentifier (SSID)/Internet Protocol (IP) DataBase (DB) 130.

The mobile terminal A 110-1 and the mobile terminal B 110-2 have a capability to access a cellular network and a Wireless Local Area Network (WLAN). For example, the mobile terminal A 110-1 and the mobile terminal B 110-2 may be one of a cellular phone, a Personal Communication System (PCS), a Personal Digital Assistant (PDA), an International Mobile Telecommunication-2000 (IMT-2000) terminal, and the like.

The base station 120 is an access node of a cellular network, and performs wireless communication with mobile terminals inside a cell of the base station itself in accordance with a standard of the cellular network. For example, the base station 120 may process a physical signal with the mobile terminals in accordance with a Code Division Multiple Access (CDMA) scheme or a Wideband Code Division Multiple Access (WCDMA) scheme. In addition, the base station 120 assigns an SSID to a WLAN formed by mobile terminals that belong to the cellular network, and assigns an IP address to each mobile terminal with reference to information stored in the SSID/IP DB 130. Also, the base station 120 stores a newly set SSID and newly set IP addresses in the SSID/IP DB 130, and when the WLAN is released, deletes the SSID and the IP addresses stored in the SSID/IP DB 130.

The SSID/IP DB 130 serves as a database storing SSIDs and IP addresses used for the WLANs formed by mobile terminals that belong to the cellular network. That is, the SSID/IP DB 130 stores information on a current status of SSIDs and IP addresses used by mobile terminals. Therefore, a service provider may understand an occurrence history of the WLAN associated with terminals through the information stored in the SSID/IP DB 130, and determine a billing account using the occurrence history. Here, the WLAN denotes a WLAN according to an ad-hoc mode. However, an SSID and IP addresses used for a WLAN according to the infrastructure mode may be stored in the SSID/IP DB 130 depending on the intention of a system operator.

Though the SSID/IP DB 130 is illustrated as a separate entity independent of the base station 120 in FIG. 1, the SSID/IP DB 130 may be included inside the base station 120, according to an exemplary embodiment of the present invention.

In the cellular wireless communication system configured in FIG. 1, a process of establishing an ad-hoc mode connection between two mobile terminals is performed as follows.

Figure 2:
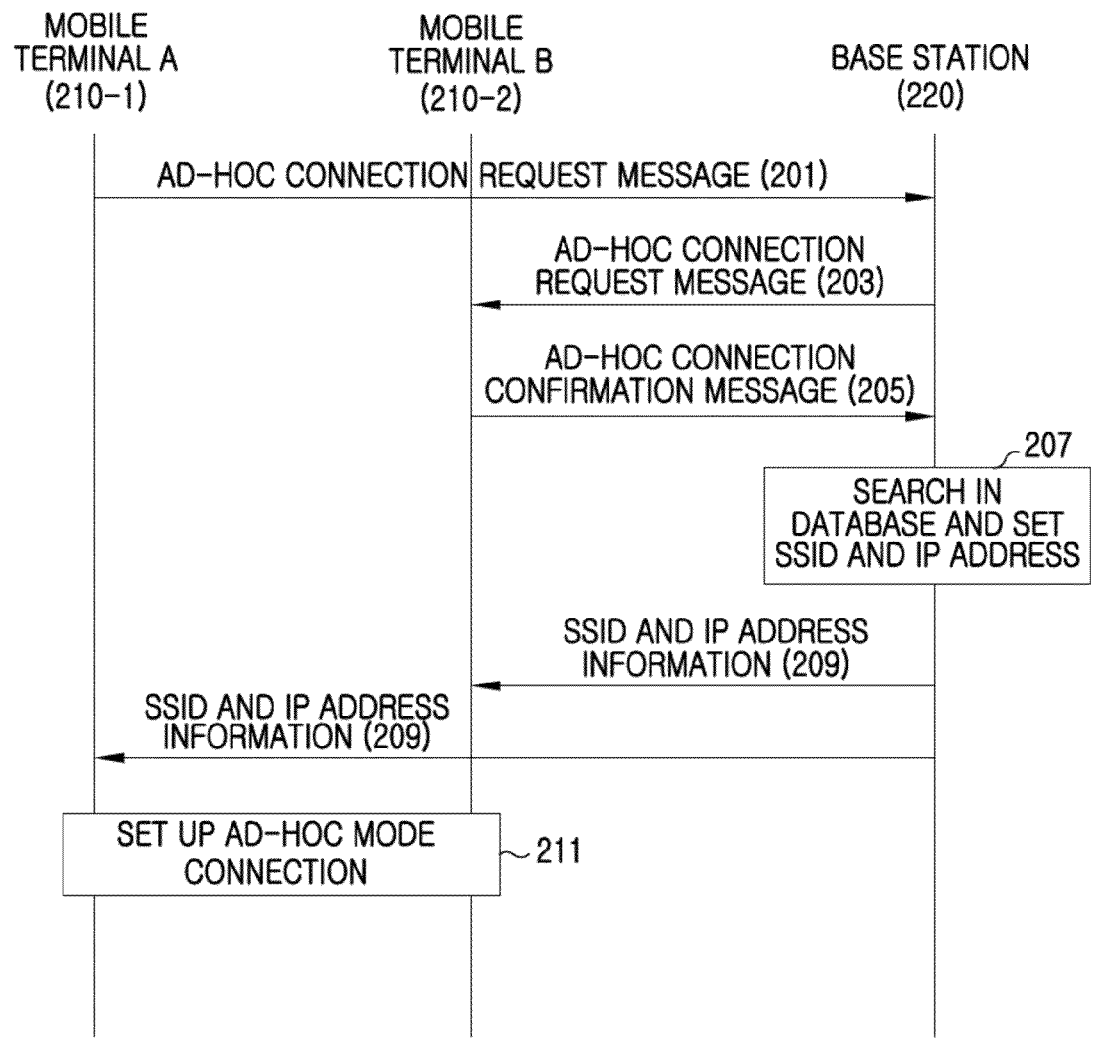
FIG. 2 is a view illustrating an example of a signal exchange for establishing an ad-hoc mode connection between mobile terminals in a cellular wireless communication system according to an exemplary embodiment of the present invention.

FIG. 2 is a view illustrating an example of a signal exchange for establishing an ad-hoc mode connection between mobile terminals in a cellular wireless communication system according to an exemplary embodiment of the present invention.

Referring to FIG. 2, in step 201, a mobile terminal A 210-1 transmits an ad-hoc connection request message to a base station 220 for ad-hoc mode connection with a mobile terminal B 210-2. For example, the mobile terminal A 210-1 may transmit the ad-hoc connection request message via a Short Message Service (SMS) channel of a cellular network. In addition, the ad-hoc connection request message includes identification of the mobile terminal B 210-2. For example, the ad-hoc connection request message may include a phone number of the mobile terminal B 210-2 as the identification of the mobile terminal B 210-2.

In step 203, the base station 220, which has received the ad-hoc connection request message, determines that the mobile terminal A 210-1 requests the ad-hoc mode connection with the mobile terminal B 210-2 through the ad-hoc connection request message, and then transmits the ad-hoc connection request message to the mobile terminal B 210-2. That is, the base station 220 determines that an ad-hoc connection-requested counterpart mobile node is the mobile terminal B 210-2 through the identification included in the ad-hoc connection request message.

In step 205, the mobile terminal B 210-2 which has received the ad-hoc connection request message accepts an ad-hoc mode connection request, and accordingly, transmits an ad-hoc connection confirmation message to the base station 220. Here, a condition for accepting ad-hoc mode connection changes depending on a specific embodiment. For example, the acceptance of the ad-hoc mode connection may require selection of a user, or may be made by determination of a relevant mobile terminal without intervention of the user.

In step 207, the base station 220 which has received the ad-hoc connection confirmation message searches in a database, and sets an SSID and IP addresses for the mobile terminal A 210-1 and the mobile terminal B 210-2. In other words, the base station 220 determines which SSIDs and IP addresses are in use by searching in the database, generates a new SSID, and assigns the newly generated SSID and unused IP addresses to the mobile terminal A 210-1 and the mobile terminal B 210-2.

In step 209, the base station 220 transmits information of the SSID and IP addresses to the mobile terminal A 210-1 and the mobile terminal B 210-2. Accordingly, the mobile terminal A 210-1 and the mobile terminal B 210-2 obtain the SSID and the IP addresses required for the ad-hoc mode connection.

In step 211, the mobile terminal A 210-1 and the mobile terminal B 210-2, which have received the SSID and the IP addresses, establish a connection using the SSID and the IP addresses. The mobile terminal A 210-1 and the mobile terminal B 210-2 perform communication with each other through the ad-hoc mode connection. At this point, a signal processing scheme of a physical layer in communication through the ad-hoc mode connection may be one of a Frequency Hopping Spread Spectrum (FHSS) scheme, a Direct Sequence Spread Spectrum (DSSS) scheme, and an Orthogonal Frequency Division Multiplexing (OFDM) scheme.

Figure 3:
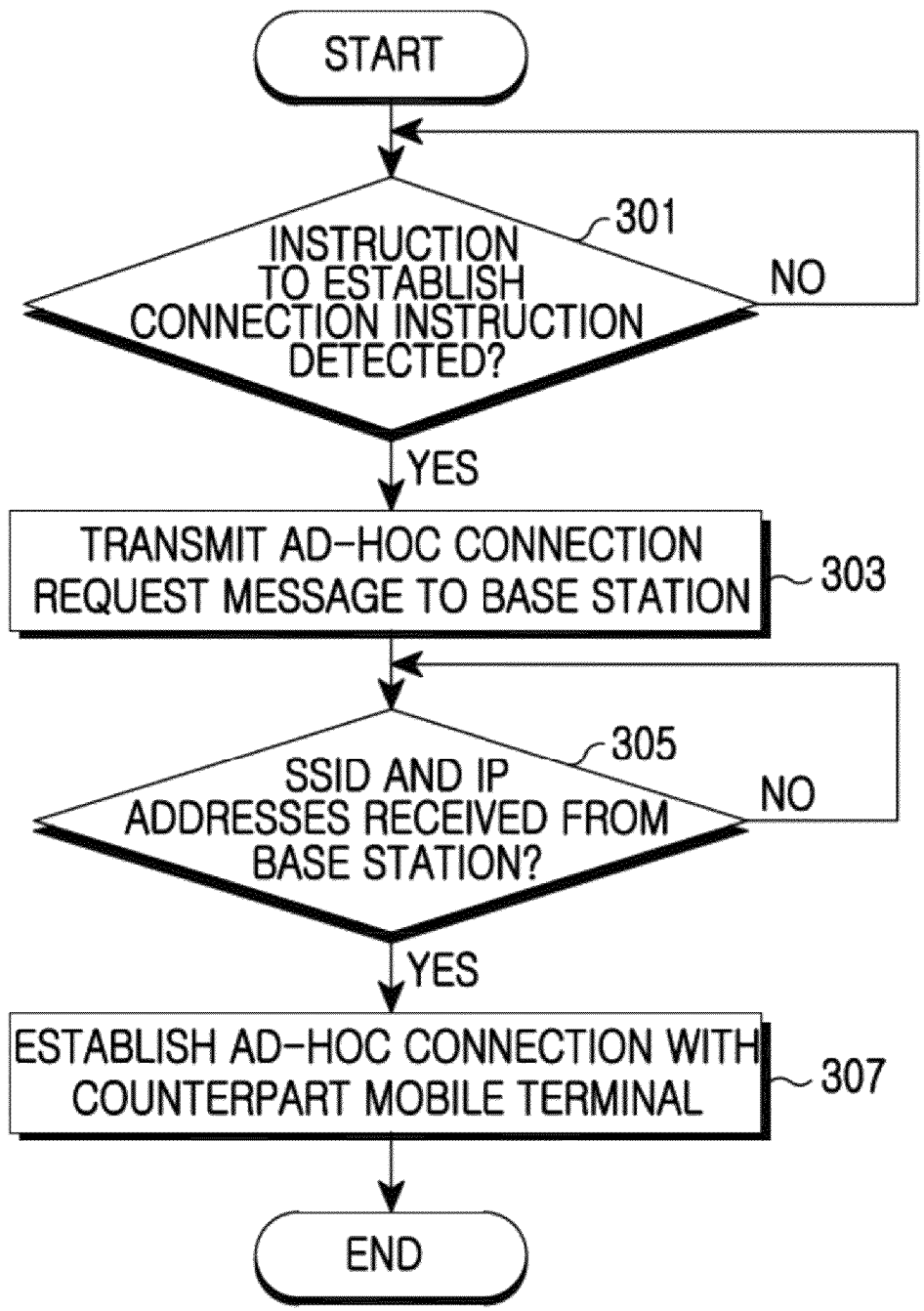
FIG. 3 is a flowchart illustrating an ad-hoc mode connection request procedure of a mobile terminal in a cellular wireless communication system according to an exemplary embodiment of the present invention.

FIG. 3 is a flowchart illustrating an ad-hoc mode connection request procedure of a mobile terminal in a cellular wireless communication system according to an exemplary embodiment of the present invention.

Referring to FIG. 3, in step 301, the mobile terminal determines whether an instruction by a user to establish an ad-hoc connection is detected. The instruction to establish an ad-hoc connection may be detected based on the actuation of a key on the mobile terminal by the user. In other words, the mobile terminal may determine whether to establish an ad-hoc mode connection with a counterpart mobile terminal based on an instruction from the user that is detected when a key is actuated on the mobile terminal.

When the ad-hoc mode connection is instructed to be established, the mobile terminal transmits an ad-hoc connection request message to a base station in step 303. That is, the mobile terminal generates the ad-hoc connection request message including identification of the counterpart mobile terminal, and transmits the ad-hoc connection request message to the base station via a channel of a cellular network. For example, the identification may be a phone number, and the ad-hoc connection request message may be transmitted via an SMS channel.

After transmitting the ad-hoc connection request message, the mobile terminal determines whether an SSID and IP address information are received from the base station in step 305. At this point, the SSID and the IP address information are received via a channel of the cellular network. For example, the SSID and the IP address information may be received via the SMS channel.

When the SSID and the IP address information are received, the mobile terminal establishes an ad-hoc mode connection with the counterpart mobile terminal using the SSID and the IP address information in step 307. The mobile terminal performs communication through the ad-hoc mode connection.

Figure 4:
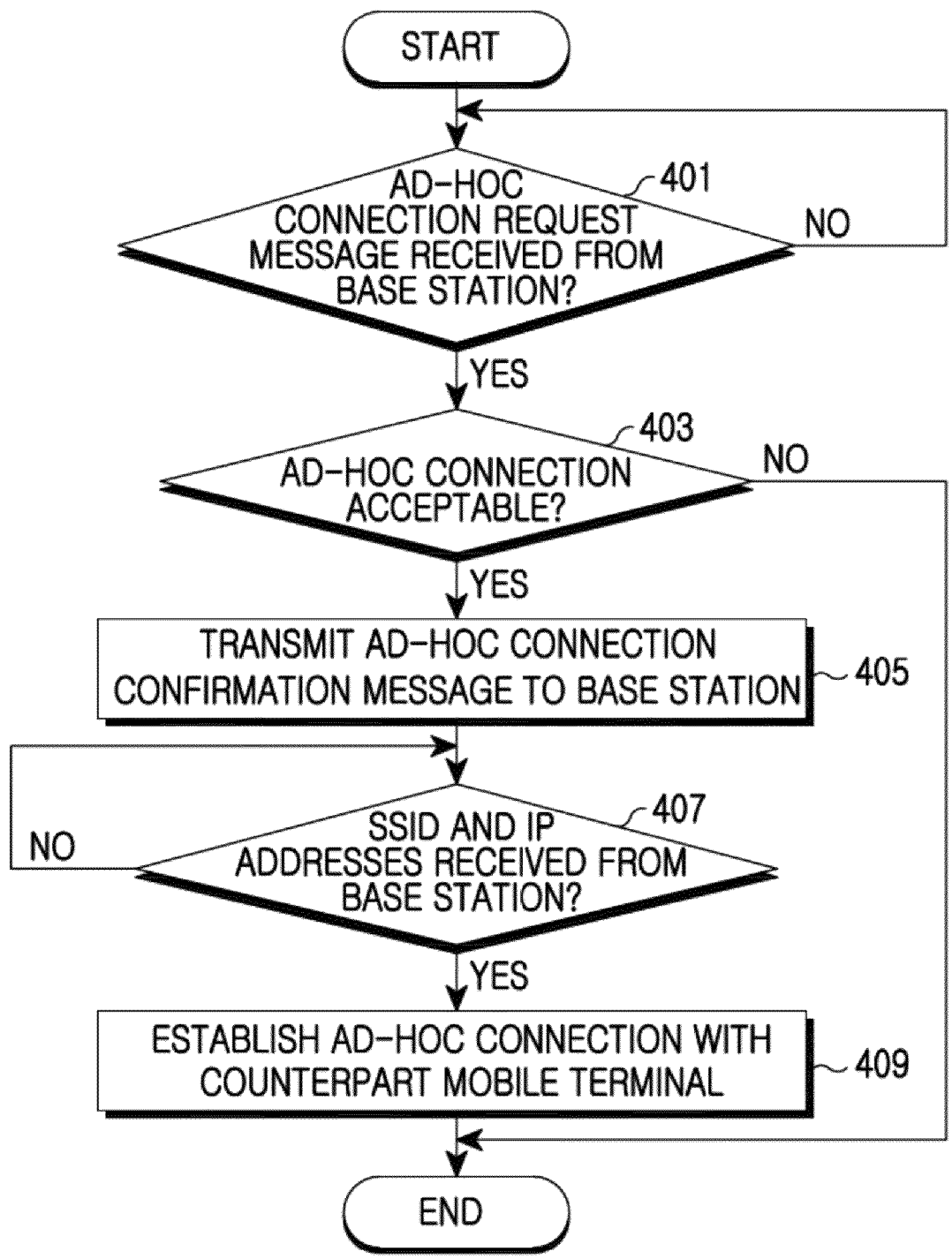
FIG. 4 is a flowchart illustrating an ad-hoc mode connection accept procedure of a mobile terminal in a cellular wireless communication system according to an exemplary embodiment of the present invention.

FIG. 4 is a flowchart illustrating an ad-hoc mode connection accept procedure of a mobile terminal in a cellular wireless communication system according to an exemplary embodiment of the present invention.

Referring to FIG. 4, in step 401, the mobile terminal determines whether an ad-hoc connection request message is received from a base station. At this point, the ad-hoc connection request message is received via a channel of a cellular network. For example, the ad-hoc connection request message may be received via an SMS channel.

When the ad-hoc connection request message is received, the mobile terminal determines whether an ad-hoc connection request is acceptable in step 403. For example, in the case of accepting the ad-hoc mode connection through a user's selection, the mobile terminal may display a screen querying whether to accept a connection request through a display unit, and determine whether the connection is accepted by the user's key input. Alternatively, when the ad-hoc mode connection is accepted by determination of the mobile terminal without the user's invention, the mobile terminal determines whether a condition for acceptance is met. When the ad-hoc mode connection is not accepted, the mobile terminal ends the present procedure.

On the other hand, when the ad-hoc mode connection is accepted, the mobile terminal transmits an ad-hoc connection confirmation message informing of the acceptance of the ad-hoc mode connection to the base station in step 405. At this point, the ad-hoc connection confirmation message is transmitted via a channel of the cellular network. For example, the ad-hoc connection confirmation message may be transmitted via the SMS channel.

After transmitting the ad-hoc connection confirmation message, the mobile terminal determines whether an SSID and IP address information are received from the base station in step 407. At this point, the SSID and the IP address information are received via a channel of the cellular network. For example, the SSID and the IP address information may be received via the SMS channel.

When the SSID and the IP address information are received, the mobile terminal establishes an ad-hoc mode connection with a counterpart mobile terminal using the SSID and the IP addresses in step 409. The mobile terminal performs communication via the ad-hoc mode connection.

Figure 5:
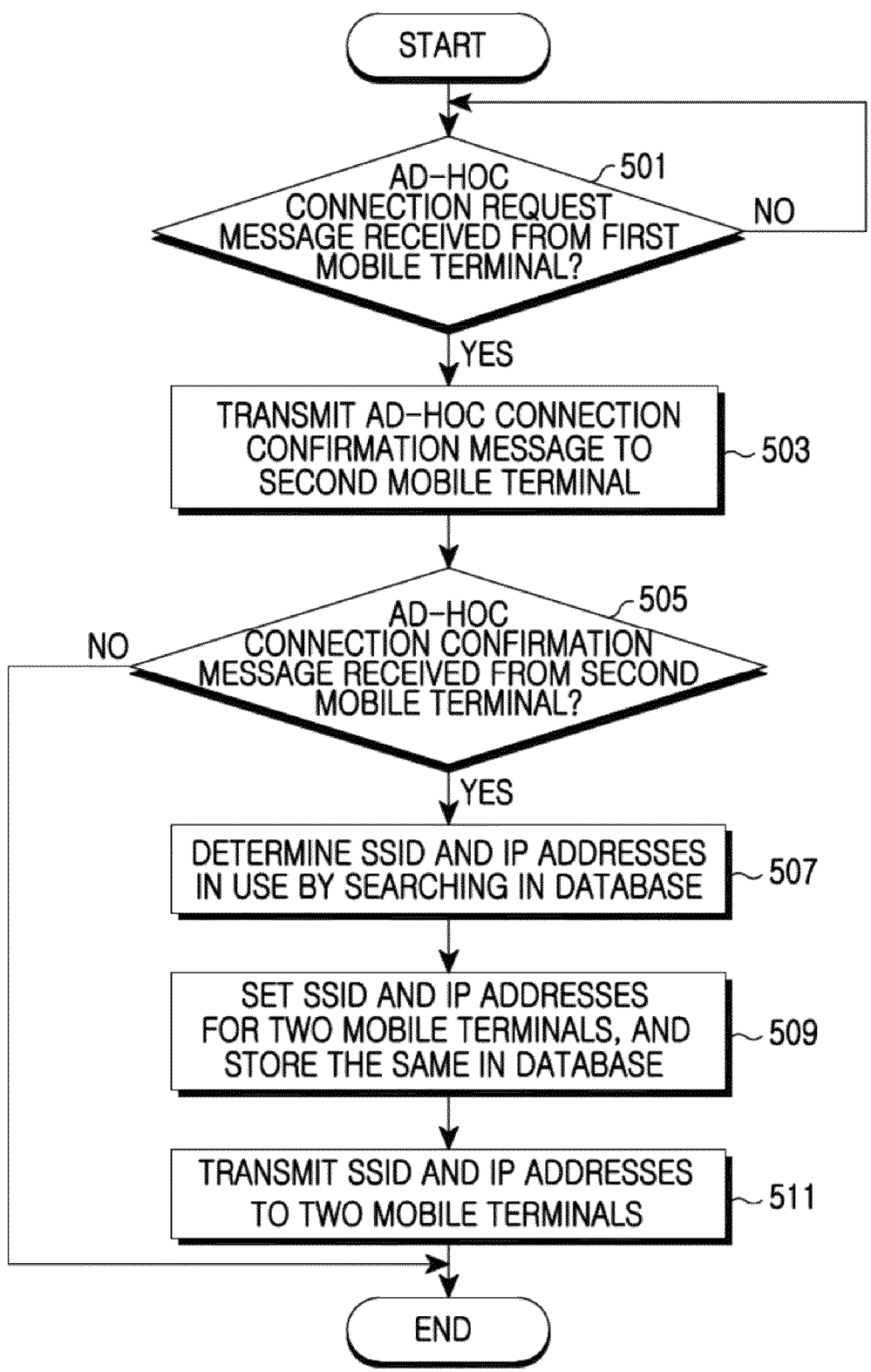
FIG. 5 is a flowchart illustrating an ad-hoc mode connection control procedure of a base station in a cellular wireless communication system according to an exemplary embodiment of the present invention.

FIG. 5 is a flowchart illustrating an ad-hoc mode connection control procedure of a base station in a cellular wireless communication system according to an exemplary embodiment of the present invention.

Referring to FIG. 5, in step 501, the base station determines whether an ad-hoc connection request message is received from a first mobile terminal. At this point, the ad-hoc connection request message is received via a channel of a cellular network. For example, the ad-hoc connection request message may be received via an SMS channel.

When the ad-hoc connection request message is received, the base station transmits the ad-hoc connection request message to a second mobile terminal in step 503. That is, the base station determines that an object of an ad-hoc connection request is the second mobile terminal using an identification of a mobile terminal included in the received ad-hoc connection request message, and transmits the ad-hoc connection request message to the second mobile terminal via a channel of a cellular network. For example, the identification may be a phone number, and the ad-hoc connection request message may be transmitted via the SMS channel.

After transmitting the ad-hoc connection request message, the base station determines whether an ad-hoc connection confirmation message is received from the second mobile terminal in step 505. Here, the ad-hoc connection confirmation message is a message informing of acceptance of the connection by the second mobile terminal, and is received via a channel of the cellular network. For example, the ad-hoc connection confirmation message may be received via the SMS channel.

When the ad-hoc connection confirmation message is received, the base station searches in a database and determines which SSIDs and IP addresses are in use in step 507. Here, the database stores SSIDs and IP address information that is used for any WLAN formed by mobile terminals belonging to the cellular network. The database may be part of the base station, or may exist as a separate entity.

After determining the SSIDs and the IP addresses that are in use, the base station sets for two mobile terminals an SSID and IP addresses that are not in use, and then stores the SSID and IP addresses for the two mobile terminals in the database in step 509. In other words, the base station generates a new SSID and assigns unused IP addresses to the two mobile terminals.

In step 511, the base station transmits the SSID and the IP address information to the two mobile terminals. At this point, the SSID and the IP address information are transmitted via a channel of the cellular network. The SSID and the IP address information may be transmitted via the SMS channel.

Figure 6:
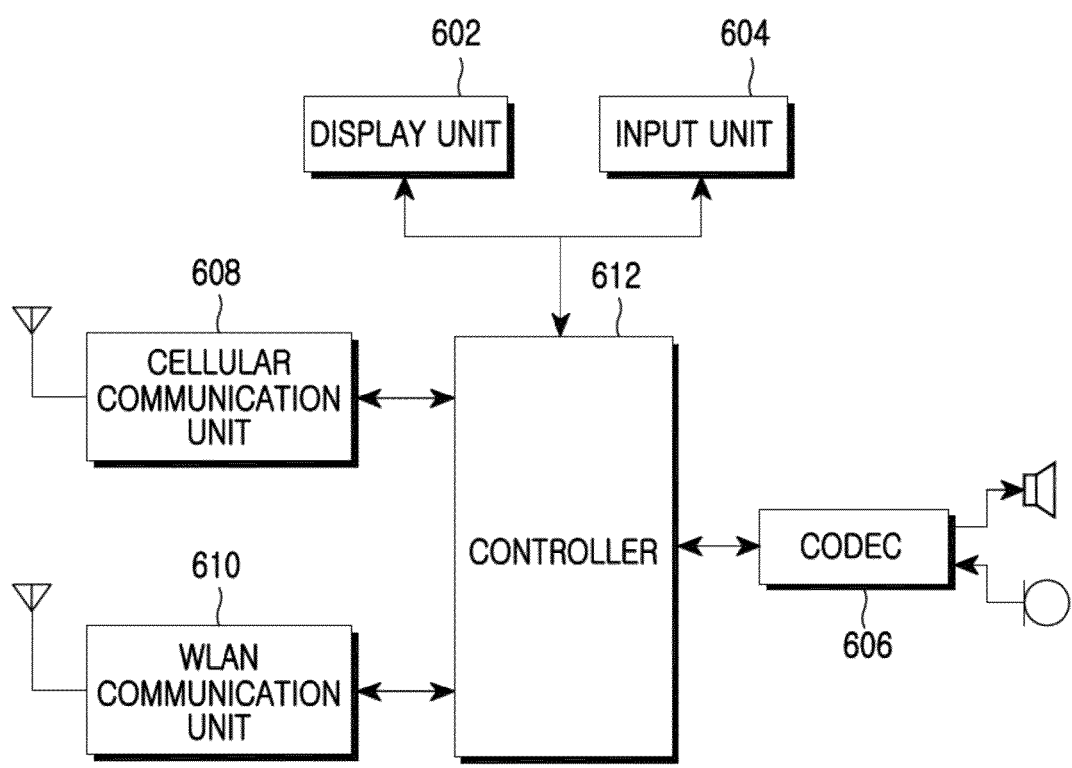
FIG. 6 is a block diagram illustrating a terminal in a cellular wireless communication system according to an exemplary embodiment of the present invention.

FIG. 6 is a block diagram illustrating a mobile terminal in a cellular wireless communication system according to an exemplary embodiment of the present invention.

Referring to FIG. 6, the mobile terminal includes a display unit 602, an input unit 604, a COder-DECoder (CODEC) 606, a cellular communication unit 608, a WLAN communication unit 610, and a controller 612.

The display unit 602 displays status information, numbers, letters, and images generated during an operation of the mobile terminal. The input unit 604 includes a keypad of the mobile terminal, and provides key input data corresponding to a key actuated by a user to the controller 612. The CODEC 606 converts digital sound and voice data provided from the controller 612 into an analog signal, outputs the same via a speaker, converts an analog signal input via a microphone into digital sound and voice data, and provides the same to the controller 612.

The cellular communication unit 608 provides a wireless interface for accessing a cellular network. That is, the cellular communication unit 608 converts transmission data provided from the controller 612 into a Radio Frequency (RF) signal according to a physical layer standard of the cellular network, and transmits the RF signal via an antenna. In addition, the cellular communication unit 608 converts an RF signal received via the antenna into data according to the physical layer standard of the cellular network. For example, the physical layer standard of the cellular network may be one of a CDMA scheme, a WCDMA scheme, and the like.

The WLAN communication unit 610 provides a wireless interface for accessing a WLAN. That is, the WLAN communication unit 610 converts transmission data provided from the controller 612 into an RF signal according to a physical layer standard of the WLAN, and transmits the same via an antenna. In addition, the WLAN communication unit 610 converts an RF signal received via the antenna into data according to the physical layer standard of the WLAN. For example, the physical layer standard of the WLAN may be one of an InfRared (IR) scheme, an FHSS scheme, a DSSS scheme, an OFDM scheme, and the like.

The controller 612 controls overall operations of the mobile terminal. For example, the controller 612 may control voice communication and SMS functions using the cellular communication unit 608, and may control a WLAN communication function that uses the WLAN communication unit 610. More particularly, when establishing an ad-hoc mode connection using the WLAN communication unit 610, the controller 612 controls functions in order to obtain parameters, that is, SSID and IP addresses required for establishing the ad-hoc mode connection through the cellular network. Functions for obtaining the SSID and the IP addresses during a connection request and a connection acceptance are described below.

A case of requesting a connection is described below. First, the controller 612 recognizes an ad-hoc connection instruction by a user based on key input data provided from the input unit 604 corresponding to the actuation of a key by the user. Accordingly, the controller 612 generates an ad-hoc connection request message including identification of a counterpart mobile terminal. For example, the identification may be a phone number. In addition, the cellular communication unit 608 transmits the ad-hoc connection request message to a base station via a channel of the cellular network. For example, the ad-hoc connection request message may be transmitted via an SMS channel. Also, the cellular communication unit 608 receives an SSID and IP address information from the base station. For example, the SSID and the IP address information may be received via the SMS channel.

The controller 612, which has confirmed reception of the SSID and the IP address information, establishes ad-hoc mode connection using the SSID and the IP addresses. Further, the WLAN communication unit 610 transmits data provided from the controller 612, and provides received data to the controller 612 via the ad-hoc mode connection.

A case of accepting a connection is described below. When an ad-hoc connection request message is received from the base station, the controller 612 determines whether the ad-hoc connection request is acceptable. For example, the ad-hoc connection request message may be received via the SMS channel. At this point, the operation of the controller 612 changes depending on an acceptance determining method. For example, in the case where the ad-hoc mode connection is accepted according to a user's selection, the controller 612 may display a screen querying whether to accept a connection request through the display unit 602, and may determines whether the connection is accepted based on key input data provided from the input unit 604 corresponding to the actuation of a key by the user. On the other hand, in the case where the ad-hoc mode connection is accepted by the mobile terminal without the user's intervention, the controller 612 determines whether a condition for acceptance is met. When the ad-hoc mode connection is accepted, the controller 612 generates an ad-hoc connection confirmation message, and the cellular communication unit 608 transmits the ad-hoc connection confirmation message to the base station. For example, the cellular communication unit 608 may transmit the ad-hoc connection confirmation message via the SMS channel. In addition, the cellular communication unit 608 receives an SSID and the IP address information from the base station. For example, the SSID and the IP address information may be received via the SMS channel. The controller 612, which has confirmed reception of the SSID and the IP address information, establishes the ad-hoc mode connection with a counterpart mobile terminal using the SSID and the IP addresses. Also, the WLAN communication unit 610 transmits data provided from the controller 612 and provides received data to the controller 612 via the ad-hoc mode connection.

Figure 7:
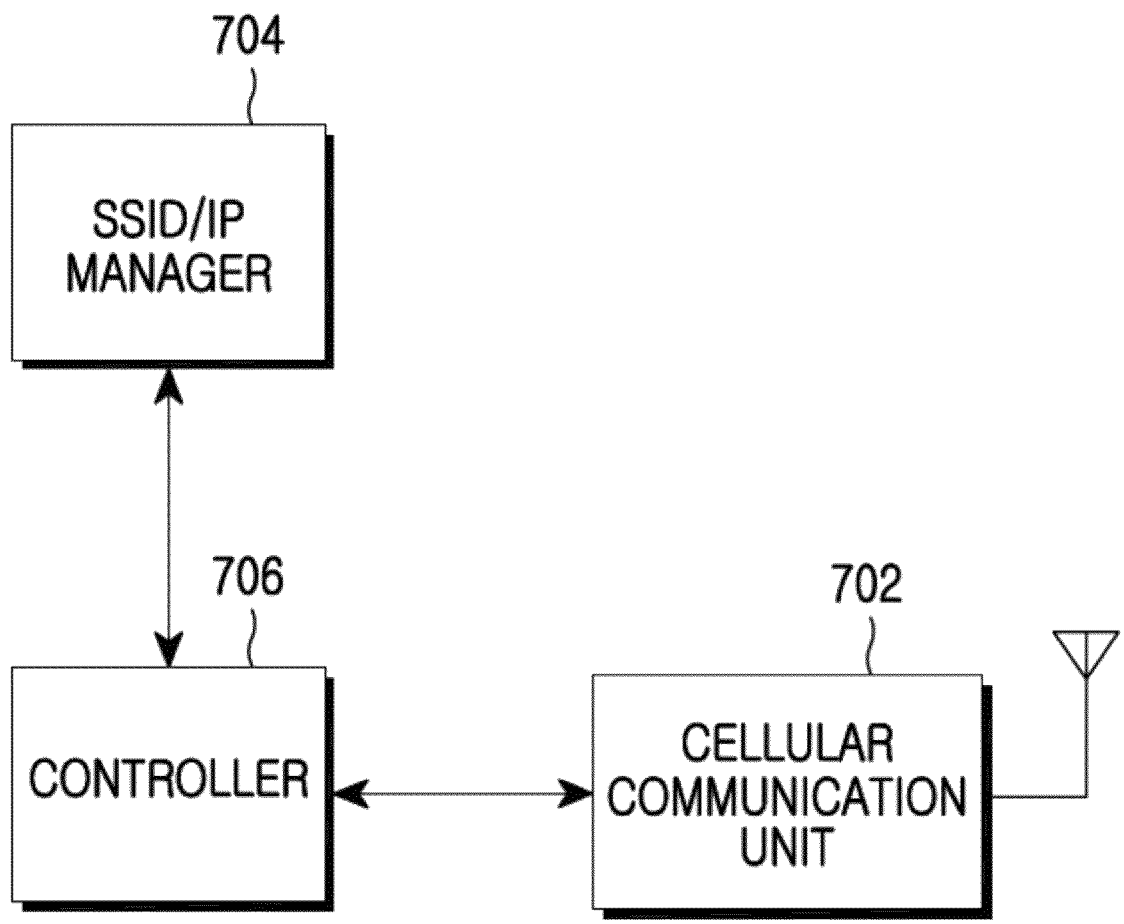
FIG. 7 is a block diagram illustrating a base station in a cellular wireless communication system according to an exemplary embodiment of the present invention.

FIG. 7 is a block diagram illustrating a base station in a cellular wireless communication system according to an exemplary embodiment of the present invention.

Referring to FIG. 7, the base station includes a cellular communication unit 702, an SSID/IP manager 704, and a controller 706.

The cellular communication unit 702 provides a wireless interface for performing wireless communication with a mobile terminal. That is, the cellular communication unit 702 converts transmission data provided from the controller 706 into an RF signal according to a physical layer standard of the cellular network, and transmits the RF signal via an antenna. In addition, the cellular communication unit 702 converts an RF signal received via the antenna into data according to a physical layer standard of the cellular network. For example, the physical layer standard of the cellular network may be one of the CDMA scheme, the WCDMA scheme, and the like.

More particularly, according to an exemplary embodiment of the present invention, the cellular communication unit 702 receives an ad-hoc connection request message and an ad-hoc connection confirmation message from a mobile terminal, and transmits the ad-hoc connection request message to a mobile terminal. In addition, the cellular communication unit 702 transmits an SSID and IP address information provided from the controller 706 to a mobile terminal. At this point, transmission and reception of a message and information may be performed via an SMS channel.

The SSID/IP manager 704 manages SSIDs and IP addresses used by terminals that may access any WLAN. At this point, information on the current statuses of any SSIDs and IP addresses in use are stored in a database. The database may be included in the SSID/IP manager 704, or may exist outside the base station as a separate entity independent of the base station. In the case where the database exists outside the base station, the SSID/IP manager 704 has an interface for information exchange with the external database.

The SSID/IP manager 704 sets an SSID and IP addresses for mobile terminals for which ad-hoc mode connection is to be established. In more detail, the SSID/IP manager 704 determines which SSIDs and IP addresses are in use by searching in the database, generates a new SSID, and assigns unused IP addresses to the mobile terminals. In addition, the SSID/IP manager 704 stores the SSID and the IP addresses set for the ad-hoc mode connection of the mobile terminals in the database. That is, the SSID/IP manager 704 updates the database according to the newly set SSID and the newly set IP addresses.

The controller 706 controls overall functions of the base station. For example, the controller 706 may control a cellular network access procedure of mobile terminals. More particularly, according to an exemplary embodiment of the present invention, the controller 706 confirms a request and acceptance of mobile terminals with respect to establishment of an ad-hoc mode connection. That is, the controller 706 confirms an ad-hoc mode connection request through an ad-hoc connection request message received via the cellular communication unit 702, and confirms an ad-hoc mode connection acceptance through an ad-hoc connection confirmation message received via the cellular communication unit 702. At this point, when the ad-hoc connection request message is received, the controller 706 determines a counterpart mobile terminal through an identification included in the ad-hoc connection request message, and transmits the ad-hoc connection request message to the counterpart mobile terminal. For example, the identification may be a phone number.

When a request and acceptance of mobile terminals with respect to the establishment of the ad-hoc mode connection are confirmed, the controller 706 instructs the SSID/IP manager 704 to set an SSID and IP addresses. In addition, the controller 706 controls the cellular communication unit 702 to transmit the SSID and the IP address information provided from the SSID/IP manager 704 to the mobile terminals.

Since parameters required for establishing an ad-hoc mode connection are determined by a base station in a cellular wireless communication system, complexity of a mobile terminal is reduced, and convenience of a user of a mobile terminal for establishment of an ad-hoc mode connection is increased. In addition, since a collection of history for an occurrence and a disappearance of a WLAN by mobile terminals becomes easier, a billing amount may be more accurately measured by a service provider.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a mobile terminal in a cellular wireless communication system, the method comprising:

transmitting a request message requesting an ad-hoc mode connection with a counterpart mobile terminal to a base station in a cellular network;

receiving a Service Set IDentifier (SSID) and Internet Protocol (IP) address information from the base station; and establishing the ad-hoc mode connection with the counterpart mobile terminal using the SSID and the IP address information, wherein the received SSID and IP addresses are determined by searching in a database, determining which SSIDs and IP addresses are in use, generating a new SSID, and assigning unused IP addresses.

2. The method of claim 1, further comprising:

generating the request message comprising a phone number of the counterpart mobile terminal as identification of the counterpart mobile terminal.

3. The method of claim 1, wherein the transmitting to and the receiving from the base station is performed via a Short Message Service (SMS) channel.

4. The method of claim 1, further comprising:

recognizing that the ad-hoc mode connection with the counterpart mobile terminal is instructed by a user based on an actuation of a key by the user.

5. A method for operating a mobile terminal in a cellular wireless communication system, the method comprising:

receiving a request message requesting acceptance of an ad-hoc mode connection with a counterpart mobile terminal from a base station in a cellular network;

transmitting a confirmation message informing of the acceptance to the base station when the ad-hoc mode connection is acceptable;

receiving a Service Set IDentifier (SSID) and Internet Protocol (IP) address information from the base station; and establishing the ad-hoc mode connection with the counterpart mobile terminal using the SSID and the IP address information, wherein the received SSID and IP addresses are determined by searching in a database, determining which SSIDs and IP addresses are in use, generating a new SSID, and assigning unused IP addresses.

6. The method of claim 5, wherein the transmitting to and the receiving from the base station is performed via a Short Message Service (SMS) channel.

7. The method of claim 5, further comprising:

when the request message is received, displaying a query on a screen of a display unit for querying a user whether to accept a connection request; and determining whether the connection request is accepted by the user based on an actuation of a key by the user.

8. A method for operating a base station in a cellular wireless communication, the method comprising:

confirming a request and acceptance of a first mobile terminal and a second mobile terminal that intend to establish an ad-hoc mode connection;

setting a Service Set IDentifier (SSID) and Internet Protocol (IP) addresses for the ad-hoc mode connection of the first mobile terminal and the second mobile terminal; and transmitting the SSID and the IP addresses to the first mobile terminal and the second mobile terminal, wherein the setting of the SSID and the IP addresses comprises:

determining which SSIDs and IP addresses are in use by searching in a database;

generating a new SSID; and assigning unused IP addresses.

9. The method of claim 8, wherein the confirming of the request and acceptance comprises:

receiving a request message requesting the ad-hoc mode connection from the first mobile terminal;

transmitting the request message to the second mobile terminal; and receiving a confirmation message accepting the ad-hoc mode connection from the second mobile terminal.

10. The method of claim 8, wherein information exchange with the first mobile terminal and the second mobile terminal is performed via a Short Message Service (SMS) channel.

11. The method of claim 8, further comprising storing the SSID and the IP addresses set for the ad-hoc mode connection of the first mobile terminal and the second mobile terminal in the database.

12. An apparatus of a mobile terminal in a cellular wireless communication system, the apparatus comprising:

a cellular communication unit for transmitting a request message requesting an ad-hoc mode connection with a counterpart mobile terminal to a base station in a cellular network, and for receiving a Service Set IDentifier (SSID) and Internet Protocol (IP) address information from the base station; and a controller for establishing the ad-hoc mode connection with the counterpart mobile terminal using the SSID and the IP address information, wherein the received SSID and IP addresses are determined by searching in a database, determining which SSIDs and IP addresses are in use, generating a new SSID, and assigning unused IP addresses.

13. The apparatus of claim 12, wherein the controller generates the request message comprising a phone number of the counterpart mobile terminal as identification of the counterpart mobile terminal.

14. The apparatus of claim 12, wherein the cellular communication unit transmits to and receives from the base station via a Short Message Service (SMS) channel.

15. The apparatus of claim 12, wherein the controller recognizes that the ad-hoc mode connection with the counterpart mobile terminal is instructed by a user based on an actuation of a key by the user.

16. An apparatus of a mobile terminal in a cellular wireless communication system, the apparatus comprising:

a cellular communication unit for receiving a request message requesting acceptance of an ad-hoc mode connection with a counterpart mobile terminal from a base station in a cellular network, and when the ad-hoc mode connection is acceptable, for transmitting a confirmation message informing of the acceptance to the base station, and for receiving a Service Set IDentifier (SSID) and Internet Protocol (IP) address information from the base station; and a controller for establishing the ad-hoc mode connection with the counterpart mobile terminal using the SSID and the IP address information, wherein the received SSID and IP addresses are determined by searching in a database, determining which SSIDs and IP addresses are in use, generating a new SSID, and assigning unused IP addresses.

17. The apparatus of claim 16, wherein the cellular communication unit transmits to and receives from the base station via a Short Message Service (SMS) channel.

18. The apparatus of claim 16, further comprising:

a display unit for displaying a query on a screen for querying a user whether to accept a connection request, when the request message is received, wherein the controller determines whether the connection request is accepted by the user based on an actuation of a key by the user.

19. An apparatus of a base station in a cellular wireless communication system, the apparatus comprising:
- a controller for confirming a request and acceptance of a first mobile terminal and a second mobile terminal that intend to establish an ad-hoc mode connection;
- a manager for setting a Service Set IDentifier (SSID) and Internet Protocol (IP) addresses for the ad-hoc mode connection of the first mobile terminal and the second mobile terminal; and
- a communication unit for transmitting the SSID and the IP addresses to the first mobile terminal and the second mobile terminal,
- wherein the manager determines which SSIDs and IP addresses are in use by searching in a database, generates a new SSID, and assigns unused IP addresses.

20. The apparatus of claim 19, wherein the communication unit receives a request message requesting the ad-hoc mode connection from the first mobile terminal, transmits the request message to the second mobile terminal, and receives a confirmation message accepting the ad-hoc mode connection from the second mobile terminal.

21. The apparatus of claim 19, wherein the communication unit exchanges information with the first mobile terminal and the second mobile terminal via a Short Message Service (SMS) channel.

22. The apparatus of claim 19, wherein the manager stores the SSID and the IP addresses set for the ad-hoc mode connection of the first mobile terminal and the second mobile terminal in the database.

* * * * *